US006973507B2

(12) United States Patent
Yoon et al.

(10) Patent No.: US 6,973,507 B2
(45) Date of Patent: Dec. 6, 2005

(54) METHOD FOR RESOLUTION SERVICES OF SPECIAL DOMAIN NAMES

(75) Inventors: Ki Joo Yoon, Seoul (KR); Nam Yul Lee, Daejeon (KR)

(73) Assignee: NitGen Technologies, Inc., (KR)

( * ) Notice: Subject to any disclaimer, the term of this patent is extended or adjusted under 35 U.S.C. 154(b) by 754 days.

(21) Appl. No.: 09/930,366

(22) Filed: Aug. 15, 2001

(65) Prior Publication Data

US 2002/0188757 A1 Dec. 12, 2002

(30) Foreign Application Priority Data

Jun. 1, 2001 (KR) ............................... 2001-30933

(51) Int. Cl.[7] .............................................. G06F 15/16
(52) U.S. Cl. ..................................... 709/245; 709/220
(58) Field of Search ................................. 709/245, 220

(56) References Cited

U.S. PATENT DOCUMENTS

| | | | | |
|---|---|---|---|---|
| 6,078,943 A | * | 6/2000 | Yu | 718/105 |
| 6,327,705 B1 | * | 12/2001 | Larsson et al. | 717/174 |
| 2002/0065903 A1 | * | 5/2002 | Fellman | 709/220 |
| 2002/0087707 A1 | * | 7/2002 | Stewart et al. | 709/230 |
| 2002/0099693 A1 | * | 7/2002 | Kofsky | 707/3 |
| 2003/0110307 A1 | * | 6/2003 | De Armas et al. | 709/310 |

OTHER PUBLICATIONS

IDNS, "A Multilingual Internet," Mar. 4, 2000, http://web.archive.org/web/20000414181442/www.i-dns.net/support/download.html.*
Worldnames, "WorldNames, Inc. Provides Multilingual Technology to Network Solution for .com, .net and .org Registration Services," Dec. 7, 2000, http://www.worldnames.net/press/pressreleaseses.cfm.*

* cited by examiner

Primary Examiner—Zarni Maung
Assistant Examiner—Nghi Tran
(74) Attorney, Agent, or Firm—Harness, Dickey & Pierce, P.L.C.

(57) ABSTRACT

A method for resolution services of special domain names includes receiving and storing information related to domain names and keywords whenever at least one contents provider connects to a special domain name resolution server and requests a registration; linking the at least one contents provider which is registered with the special domain name resolution server to a special domain name service program and a special domain name database information; automatically installing the special domain name service program by downloading the special domain name service program and the special domain name database to a terminal of a connection service user upon the user connecting to contents of the at least one contents provider; and transferring to the user's terminal an IP address corresponding to a queried domain name that the user's terminal queried to the special domain name server by identifying a domain name and the user's IP address.

15 Claims, 8 Drawing Sheets

METHOD FOR RESOLUTION SERVICES OF SPECIAL DOMAIN NAMES

BACKGROUND OF THE INVENTION

1. Field of the Invention

The present invention relates to a method for resolution services of special domain names on behalf of general DNS providers, global load balance (GLB) and server load balance (SLB) service providers in application of the DNS, and Extended domain name service (x-DNS) providers who provide services of resolving specific keywords such as home language domain names and the like into IP addresses.

2. Related Arts

U.S. Pat. No. 6,249,813 Automated method of and apparatus for internet address management.

U.S. Pat. No. 6,244,758 Apparatus and method for monitoring electronic devices via a global network.

U.S. Pat. No. 6,243,749 Dynamic network address updating.

U.S. Pat. No. 6,219,715 Automatic address distributing system.

U.S. Pat. No. 6,205,489 Method for providing an internet protocol address with a domain name server.

U.S. Pat. No. 6,201,965 Telecommunication subscriber connection using a domain name system.

U.S. Pat. No. 6,167,449 System and method for identifying and locating services on multiple heterogeneous networks using a query by type.

U.S. Pat. No. 6,154,738 Method and apparatus for disseminating product information via the internet suing universal product codes.

U.S. Pat. No. 6,131,095 Method of accessing a target entity over a communications network.

U.S. Pat. No. 6,026,441 Method for establishing communication on the internet with a client having a dynamically assigned IP address.

U.S. Pat. No. 6,023,724 Apparatus and method for use therein for an ISDN LAN modem that displays fault information to local hosts through interception of host DNS request messages.

U.S. Pat. No. 6,014,660 Method and apparatus for client-sensitive name resolution using DNS.

U.S. Pat. No. 6,009,103 Method and system for automatic allocation of resources in a network.

U.S. Pat. No. 5,884,038 Method for providing an Internet Protocol address with a domain name server.

U.S. Pat. No. 5,793,763 Security system for network address translation systems.

3. Description of the Prior Art

In order to understand the present invention, we should know the history of the existing internet and the part of the DNS operating on the internet.

At present, all the computers on the internet communicate each other by using a protocol based on the Transmission Control Protocol/Internet Protocol (TCP/IP) in diverse networks all over the world.

In view of the background of the internet, the internet results from the studies as to an experimental nationwide computer network, called Advanced Research Project Agency (ARPA) net, through which the Department of Defense of the United States planed to bind the R&D institutions in the United States into one in the late 1960s.

The original goal of the ARPAnet was for government institutions to be able to share expensive computing resources. However, from the beginning, the users of the ARPAnet used remote computers shared through the network as well as shared files and software, and the ARPAnet was utilized even for the jobs of collecting the R&D achievements through the exchanges of email.

For this, the TCP/IP protocol was developed in the 1980s, which directly became the protocol of the host network of the ARPAnet. As well, with the TCP/IP protocol applied to the BSD UNIX operating system of California Berkeley University, a number of computers used in connections to the ARPAnet were connected to the local network, and other computers connected to the local network became able to communicate each other through the ARPAnet as well.

It did not take a long time that the small-scale network made up of a few host computers grew up to a network having several ten thousands of host computers, the original ARPAnet became a backbone connecting local networks on a local basis and based on the TCP/IP into one, which is called the internet.

Further, in 1988, the network called the NSFNET to which the National Science Foundation (NSF) supported funds played the role of the internet backbone, replacing the ARPAnet.

Furthermore, in 1995, the backbone changed to use the commercial backbones which were operated by long-distance communications providers such as the MCI, Sprint, and so on and commercial internet providers such as the PSInet, UUNET, and the like, which was developed into the internet network.

At the beginning, since the network was used in a scale consisting of host computers less than a few hundreds, the SRI-NIC (Stanford Research Institute-Network Information Center) managed the Host.txt file of mapping information between the names and addresses for securing uniqueness as to all the host computers connected to the network, but, with the explosive increase of the network population, the processor was overloaded and the network could not process the traffic.

Further, conflicts occurred in the part of the mapping of names and addresses for the host computers, which caused the situations of paralyzing the entire network, to thereby require a new system design.

Accordingly, in 1984, the RFC882 and RFC883 were developed which specified the domain name system, and, later, updated to the RFC1034 and RFC1035 which became the present Domain name specifications.

The domain name system is a distributed database, enables part of the entire database to be locally managed and simultaneously each part of data to be used in the client-server fashion through the entire network.

A program for storing information on domain name spaces is called a name server. The name server has information on zones and reads in the information from files or other name servers.

Further, a client of accessing the name server is called a resolver, and the resolver plays a role of querying the name server about a domain name.

Accordingly, the domain name system (DNS) has a form that the name server the resolver queries executes responses to the query. The internet at present used the DNS concept to develop to a form of domain name having special purposes, which caused providers for providing the GLB and SLB services and providers for providing services of converting specific keywords such as home language domain names and so on into IP addresses.

Further, in particularly, in case of the contents delivery network (CDN), caching servers or mirror servers are established in advance at every node of various regions for internet contents users dispersed by country and by region, and, upon connecting to view data provided by contents providers registered, users can fetch contents from a node nearest to the users through a GLB server a CDN provider holds, which is progressing at a fast speed.

FIG. 1 is a view for showing the existing general DNS operating system, in which a general internet user inputs a domain name he or she wishes to connect to through a web browser or an internet desktop application program (S101).

In order to resolve (convert into an IP address) the domain name the internet user has inputted, the web browser or the internet desktop application program transfers the domain name to pre-set name server (S102).

The name server returns an IP address corresponding to the requested domain name (S103).

However, a problem exists in the above method.

First, in case of the GLB and SLB services, the IP address of a user is exactly designated, and a node and a server are selected accordingly. However, in case of a provider of providing services associated with the existing DNS, for example, GLB services and the like, there exists a limit in designating the exact user's IP address.

This is because the existing DNS system leads to the GLB server through lots of name servers during domain name resolutions and the GLB server does not take care of the user's IP address except the IP address of a name server just before. Therefore, the GLB server has unreasonableness of distributing loads along the path of the name server the user occupies rather than resolving the domain name to enable the shortest path to be taken for connections based on a user's location.

Further, even the case of providers for providing services by converting specific keywords such as home language domains and the like into IP addresses raises inconvenience of changing DNS information in the user's system in order to be able to use domain name services as to specific keywords.

Furthermore, since the existing DNS system use general-purpose protocol and functions, it is not suitable for the specific-purpose domain name resolution. While the existing DNS system is maintained without disregard of its generality, a specific domain name a user selects should be sent to an extended domain name service server for processing, but there is no way to realize the method in the present DNS system.

SUMMARY OF THE INVENTION

In order to solve the above problems, it is an object of the present invention to provide a method capable of automatically carrying out resolution services of special domain names upon connecting to the internet with automatic installations of components for communicating with x-DNS servers an x-DNSP operates.

Further, it is another object of the present invention to provide a method capable of automatically forwarding specific domain names users select to a specific-purpose extended x-DNS server for lots of future x-DNSPs without changing users' DNSs in addition to providers of converting present specific keywords into IP addresses while maintaining general-purpose protocol and functions of the existing DNS system spread all over the world on the internet.

In order to achieve the above objects, the present invention comprises steps of (1) receiving and databasing information related to domain names and keywords if plural contents providers connect to a special domain name resolution server and requests a registration; (2) linking the plural contents providers in which the special domain name server is registered with a special domain name service program and a special domain name database information; (3) automatically installing the special domain name service program by downloading the special domain name service program and the special domain name database information to a terminal of a connection service user upon connecting to the contents of the contents provider; and (4) transferring to the user's terminal an IP address corresponding to the queried domain name by identifying the domain name and a user's IP address queried to the special domain name server if the service user is connected based on the special domain name database information with the execution of the special name service program installed in step (3).

Further, the present invention includes steps of: (1) plugging in a web browser and other internet desktop application program in a subscriber PC in order to connect to a specific CP on the internet or executing the special domain name service program for directly connecting to the special domain name server by a DLL process injection method; (2) calling the domain name from the web browser or the other internet desktop application program for the connection to the CP; (3) carrying out a socket API interrupt as to information related to the domain name to be sent to a DNS; (4) identifying whether the domain name information exists in the special domain name database; (5) carrying out a query about the special domain name to a corresponding special domain name server associated to the contents providers existing in the special domain name database if present as a result of the identification of step (4); (6) connecting to a contents server resolved in step (5); and (7) connecting to a pre-set local DNS server if absent as a result of the identification of step (4).

Further, a computer-readable storage medium of the present invention comprises steps of (1) plugging, upon a connection to the internet, in a web browser and other internet desktop application program in a subscriber PC in order to connect to a specific CP on the internet or executing a special domain name service program for directly connecting to a special domain name server by a DLL process injection method; (2) calling a domain name from the web browser or the other internet desktop application program for the connection to the CP; (3) carrying out a socket API interrupt as to information related to the domain name to be sent to a DNS; (4) identifying whether the domain name information exists in a special domain name database; (5) carrying out a query about the special domain name to a corresponding special domain name server associated to contents providers existing in the special domain name database if present as a result of the identification of step (4); (6) connecting to a contents server resolved in step (5); and (7) connecting to a pre-set local DNS server if absent as a result of the identification of step (4).

BRIEF DESCRIPTION OF THE DRAWINGS

The above objects and other advantages of the present invention will become more apparent by describing in detail a preferred embodiment thereof with reference to the attached drawings, in which.

DETAILED DESCRIPTION OF THE PREFERRED EMBODIMENTS

Hereinafter, descriptions will be made on the embodiments of the present invention with reference to the accompanying drawings.

Figure 1:
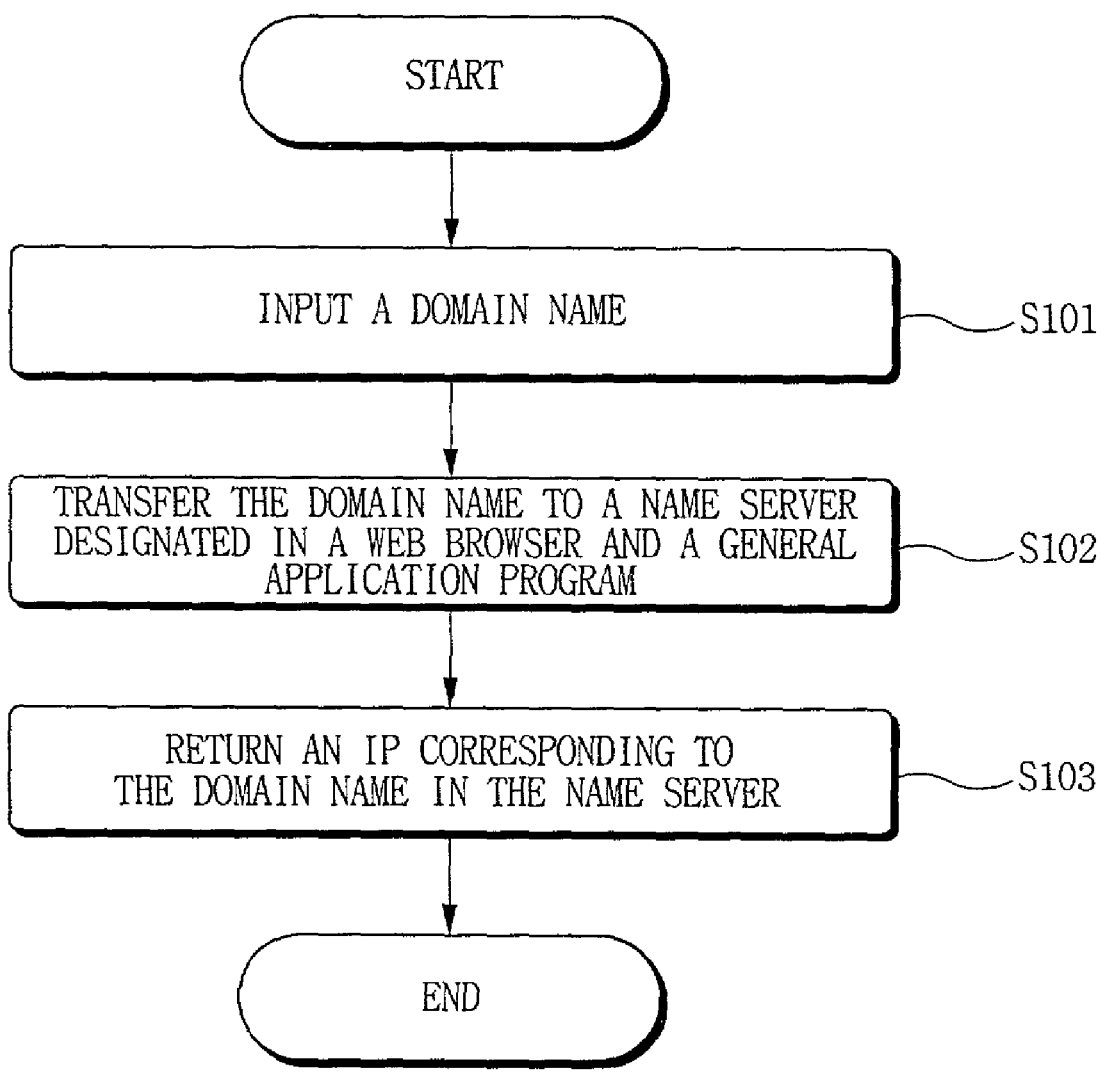
FIG. 1 is a flow chart for a general DNS operating system.
Figure 2:
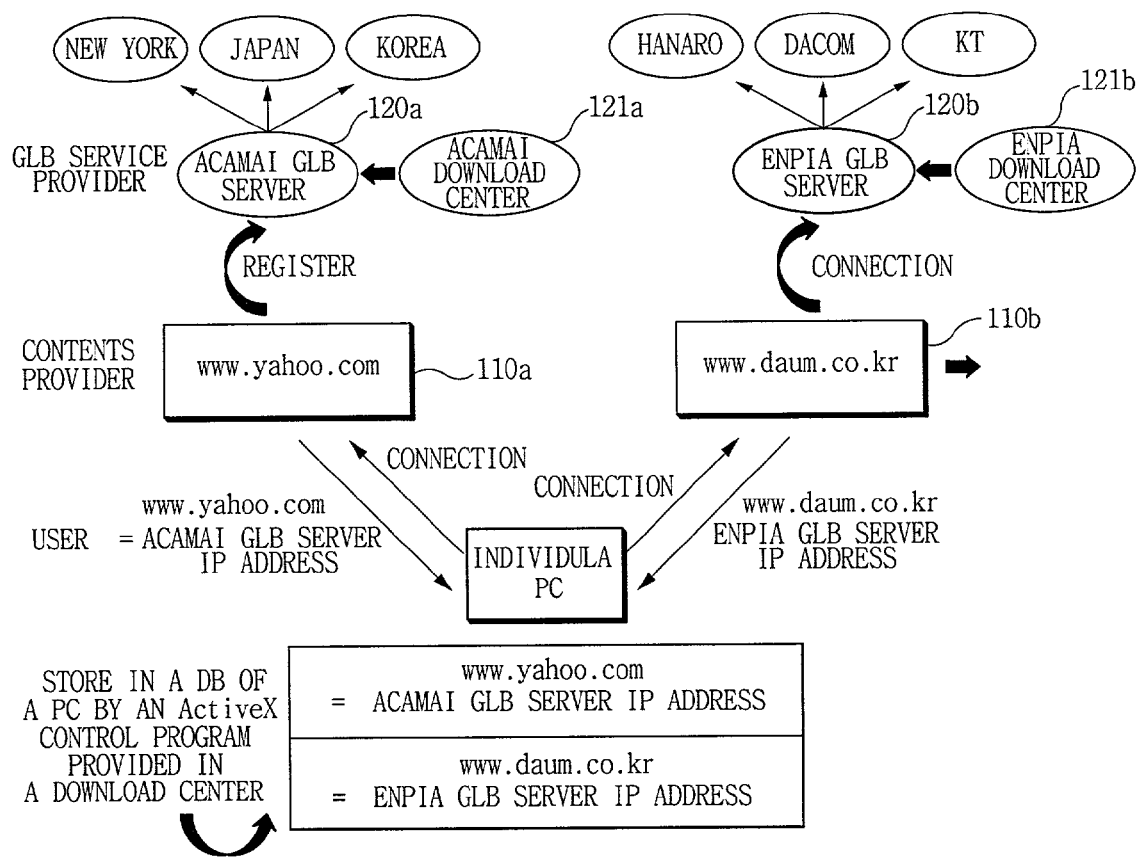
FIG. 2 is a conceptual view for showing a method for a resolution service of a special domain name according to an embodiment of the present invention.

FIG. 2 is a conceptual view for showing a method for a resolution service of a special domain name according to an embodiment of the present invention.

Specific CPs 110a and 110b are assumed as the CPs 110a and 110b registered in an x-DNS service provider (GLB provider).

When a subscriber hooked on to use contents connects to view the contents for the first time, the CPs 110a and 110b downloads and automatically installs to the subscriber PC information on an IP address and so on as to the GLB provider in which the CPs 110a and 110b are registered from GLB download centers 121a and 121b linked to the homepage of CPs 110a and 110b.

As a result, if a browser or a specific application by an installation program installed in the subscriber PC is executed when a new connection is made based on the installed DB information, the automatic installation program is automatically executed in the plug-in form.

Accordingly, when the subscriber is to connect to the specific CPs 110a and 110b on the internet by inputting a domain name he or she wishes to connect to, the domain name is intercepted, and a connection for the use of the internet is directly made to the x-DNS servers 120a and 120b with the IP addresses as to the x-DNS servers 120a and 120b of the x-DNS provider stored in the subscriber PC or the domain name rather than made to a local DNS as a connection path to the DNS.

If the CPs 110a and 110b are not registered in the subscriber PC since the CPs 110a and 110b are not registered to a specific x-DNS provider, a connection will be directly made to a local DNS stored in the subscriber PC.

For example, in case that www.yahoo.com 110a and www.daum.co.kr 110b are registered to Acamai 120a and Enpia 120b which are GLB providers, respectively, if an individual subscriber connects to a homepage of Yahoo or Daum, which are contents providers respectively, a CP user who makes a first connection is linked to the download centers 121a and 121b the respective GLB providers operate, automatically downloaded with information on the GLB providers (the downloaded contents are www.yahoo.com=Acamai, GLB server IP address, www.daum.co.kr=Enpia, and GLB server IP address), and stored in a DB of a PC with the information.

Accordingly, in case that the subscriber PC tends to connect to the CPs 110a and 110b with a domain name inputted, the information is identified for hooking, a domain name resolution service is requested to a corresponding GLB server with the hooked domain name, for example, www.yahoo.com=Acamai, GLB server IP address, www.daum.co.kr=Enpia, and GLB server IP address, and the connection changed is made to a resolved contents server.

If a domain name, for example, www.naver.com, which is not registered in the DB of a subscriber PC is inputted, a query and a resolution about the domain name are made to a DNS server designated in the PC rather than to the servers 120a and 120b of the x-DNS provider.

Further, in case that the information on the Acamai or Enpia is changed as well as in case that a PC subscriber has an item necessary to be changed upon connecting to the CPs 110a and 110b registered in the DB thereof, the CPs 110a and 110b identifies the version of the DB in the subscriber PC and automatically downloads materials to the subscriber PC from the download center of the x-DNS provider to automatically enable the version to be updated upon connecting to the corresponding homepage of the CPs 110a and 110b.

Figure 3:
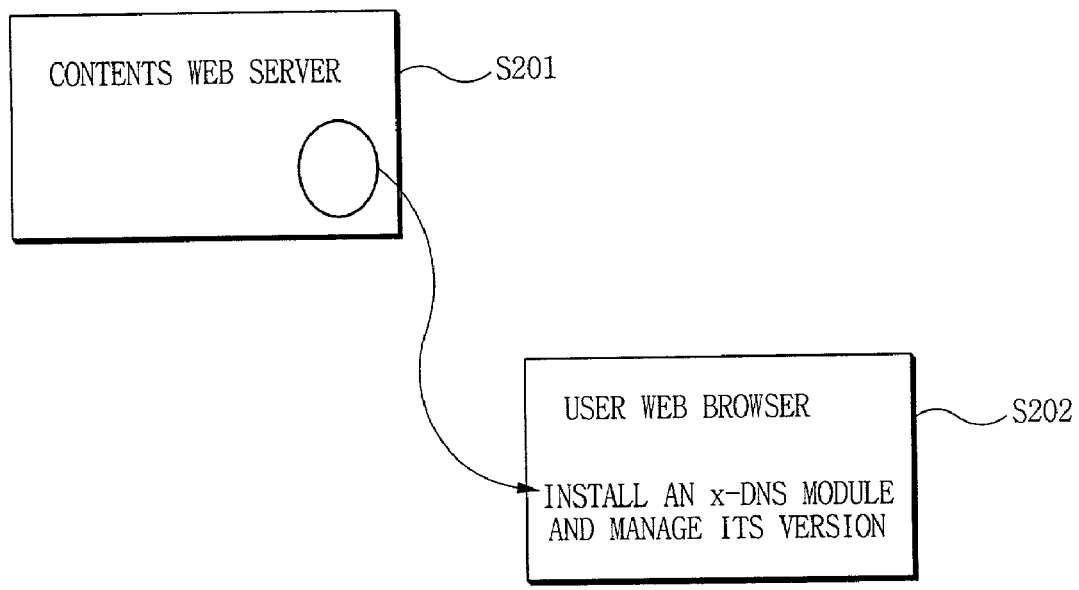
FIG. 3 is a flow chart for showing a process for automatically installing in ActiveX Control forms or version-identifying components of an x-DNS application engine module.

FIG. 3 is a conceptual view for showing a process for automatically installing in ActiveX Control forms or version-identifying components of an x-DNS application engine module according to an embodiment of the present invention.

In a contents web server (S201), a contents provider automatically installs an x-DNS module to users by embedding the modules upon executing a web browser according to its contents form (S202) and manages the version of the module.

Further, if the x-DNS application engine module is completely installed, the x-DNS search module is installed in the users' operating system by using the window system message hooking technology.

Figure 4:
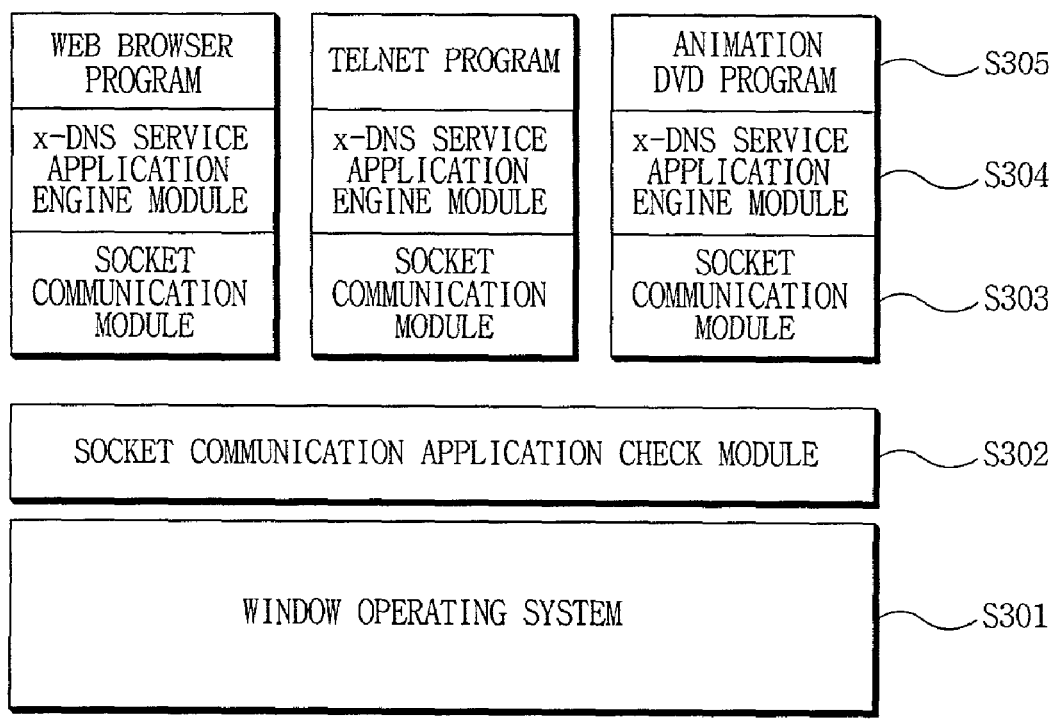
FIG. 4 is a conceptual view for an x-DNS search module in the DLL form.

FIG. 4 is a conceptual view for an x-DNS check module in the DLL form according to a preferred embodiment of the present invention.

In FIG. 4 if the module is completely installed in the users' operating system, executed or executing programs are checked (S303) by using a check module function (S302) of the x-DNS application engine module users can execute under the overall windows operating system (S301). If corresponding programs are found, the x-DNS service application engine module is executed to be driven in the process images of the programs (S304) and applied for use to the related programs, for example, web browser programs, Telnet programs, animation DVD programs, and so on (S305).

Figure 5:
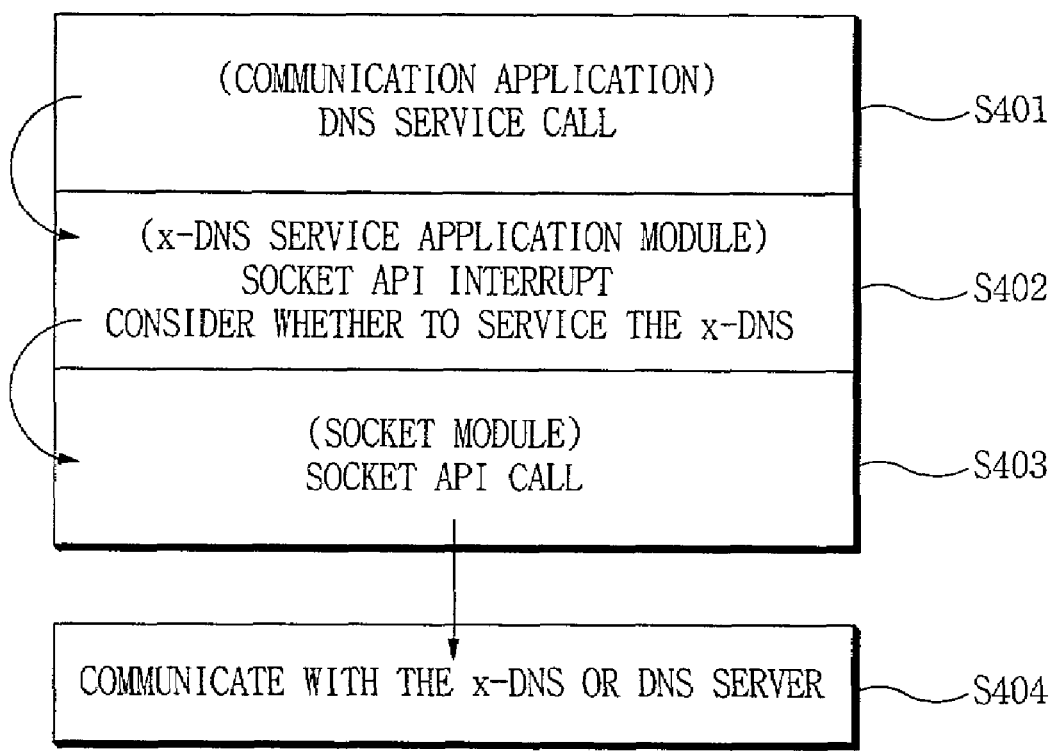
FIG. 5 is a conceptual view for an x-DNS service application engine module.

FIG. 5 is a conceptual view for an x-DNS service application engine module according to a preferred embodiment of the present invention.

The proper function of a socket communication program in the existing DNS service is to call the DNS from the socket module of a user system and communicate with a DNS server if a user calls a domain name when using the DNS service.

However, in the present invention, if the x-DNS application engine module installed in FIGS. 3 and 4 in the user's system (PC) is executed in a corresponding process image (by a DLL process injection method) and calls a domain name service in the user's system (PC) (S401), the x-DNS service application engine module interrupts a part (Socket API interrupt) and considers whether the x-DNS service is carried out or not (S402).

Thereafter, before the general DNS service method is realized, a method for hooking up on the service of the socket module is realized to receive a specific x-DNS service (S403), so it is used in a form of communicating with the x-DNS or the DNS server (S404).

Figure 6:
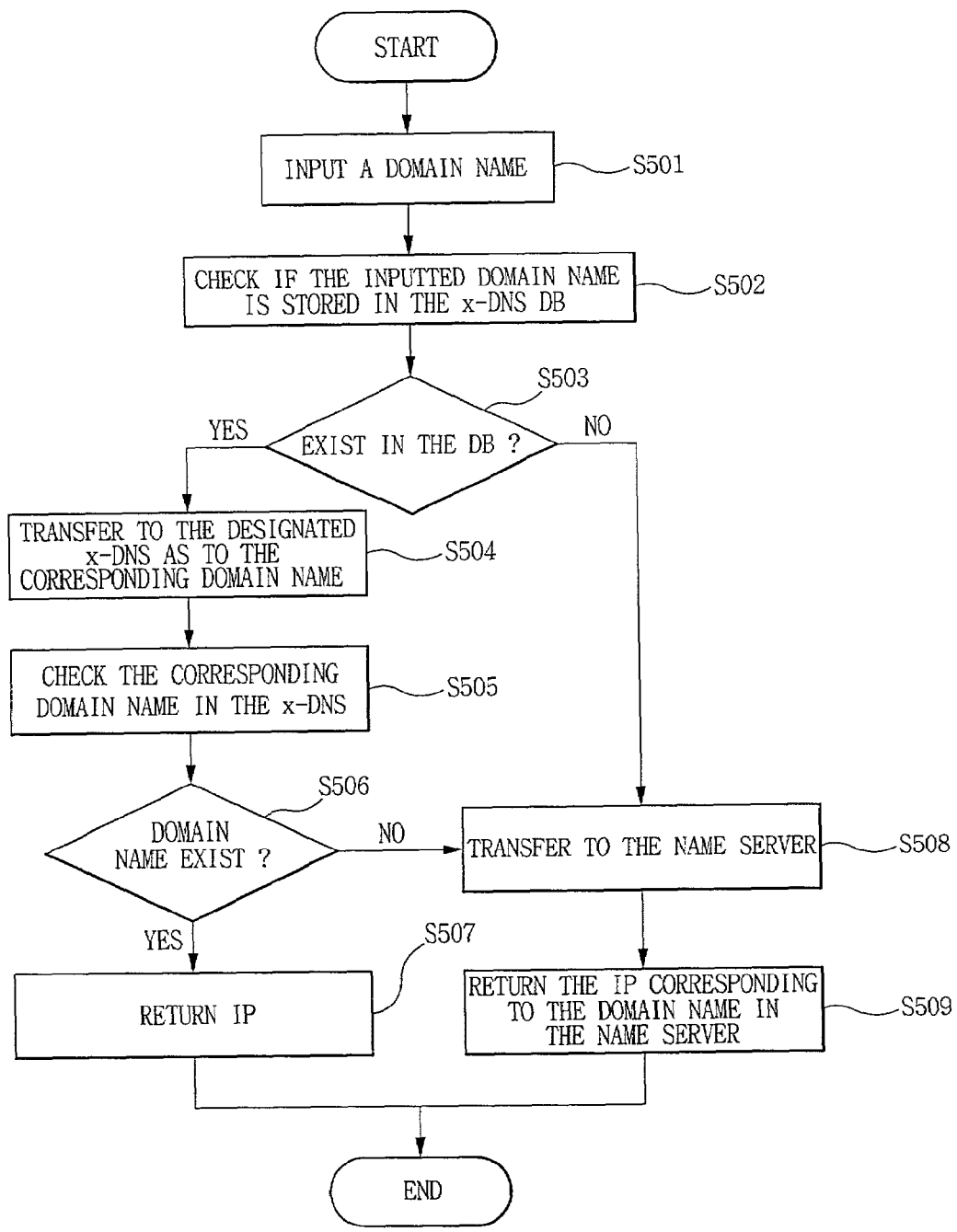
FIG. 6 is a flow chart for an x-DNS system.

FIG. 6 is an illustrative view for an Extended Domain Name Service (x-DNS) proposed by the present invention, wherein an internet user inputs a domain name to be connected in a web browser or an internet desktop application program (S501).

Further, programs of the present invention (ActiveX programs and DLL programs) are executed which are downloaded in the internet user's system to be plugged in the web browser or to be built in the internet desktop application program, and check if the inputted domain name exists in the x-DNS DB stored in the user's system (PC), as shown in Table 1 (S502).

In case that the domain name exists in a subscriber system (S503), the programs transfer the domain name to a x-DNS server designated therefor (S504), and check if the corresponding domain name exists in the x-DNS server (S505).

If the corresponding domain name exists (S506), the programs converts the domain name into an IP address (S507).

If the domain name to be transferred in step S502 is not stored in the DB shown in Table 1, the programs transfer the domain name to a name server as in the general DNS system (S508), and the name server returns an IP address corresponding to the domain name (S509).

TABLE 1 x-DNS DB structure

| Material item names | Type | Definitions |
| --- | --- | --- |
| CP name | Variable | CP provider names included in DB record |
| QueryName Type | Fixed Variable | Domain forms to be queried (www.enpia.net:individual, *.enpia.net: group) |
| x-DNS Name | Variable | Domain name to be queried |
| x-DNS protocol | Fixed Variable | Protocols to be used with a domain query in x-DNS (DNS-TCP, DNS-UDP, xDNS-TCP, xDNS-UDP) |
| Method for using x-DNS server | Fixed Variable | Query order in case that plural x-DNS servers exist (Stand-by, Round-robin) |
| x-DNS server Count | Fixed Variable | Number of x-DNS servers for query |
| Method for designating x-DNS server | Fixed Variable | Methods for designating x-DNS server (domain method, IP address method) |
| x-DNS server | Fixed Variable | x-DNS server addresses (www.enpia.net, 192.158.243.40) |

Figure 7:
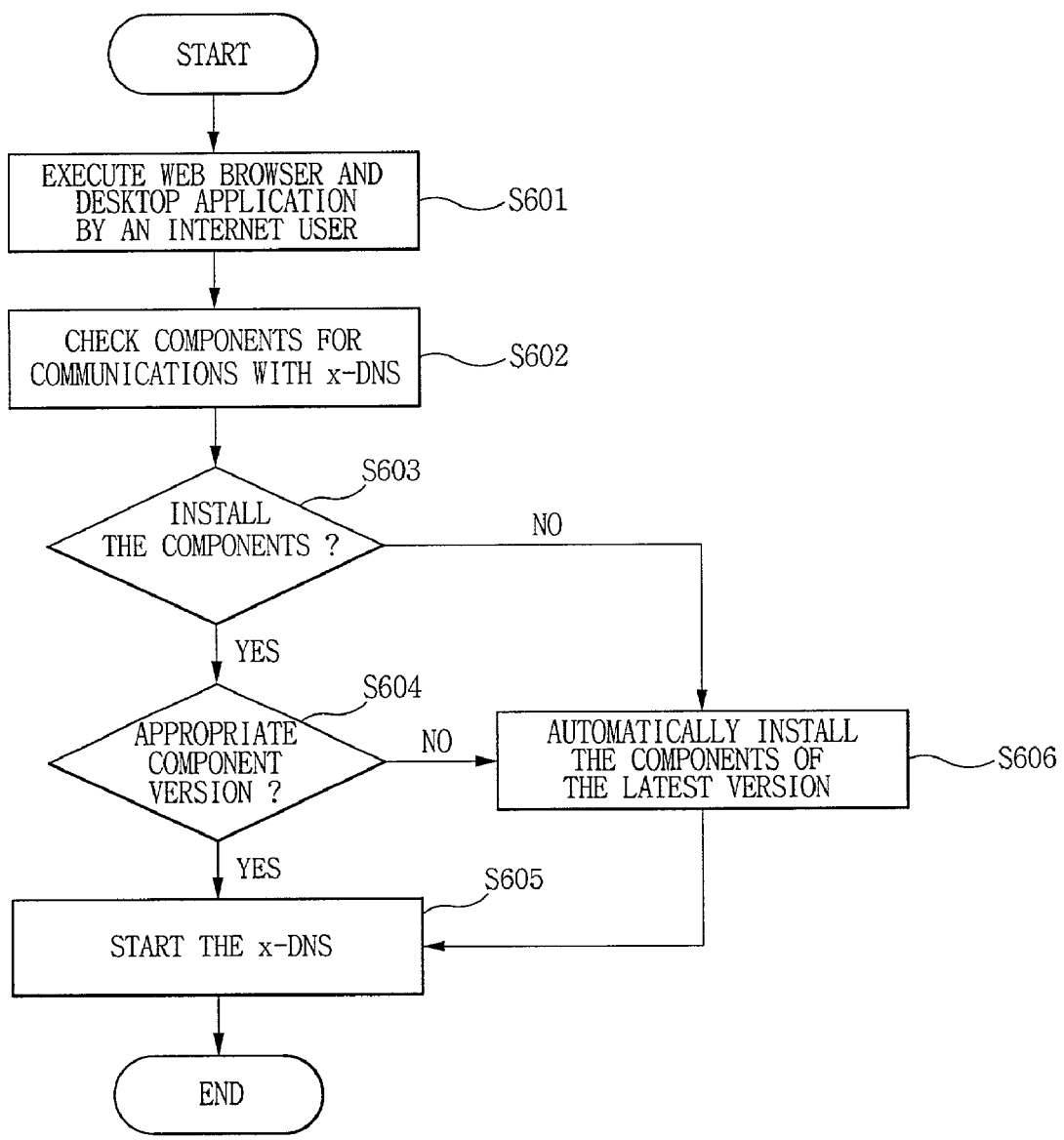
FIG. 7 is a flow chart for automatically installing and setting various components.

FIG. 7 is a flow chart for automatically installing and setting various components according to a preferred embodiment of the present invention.

First, an internet user executes a web browser and a desktop application (S601), and checks are made on whether components for communicating with an x-DNS are installed and set (S602) and on whether the components are normally installed (S603).

A verification is made on whether component versions are appropriate (S604), and an x-DNS service starts in case of appropriate (S605).

If the components are not installed or the versions are not appropriate, the components of the latest version are installed (S606) and the x-DNS service starts.

Figure 8:
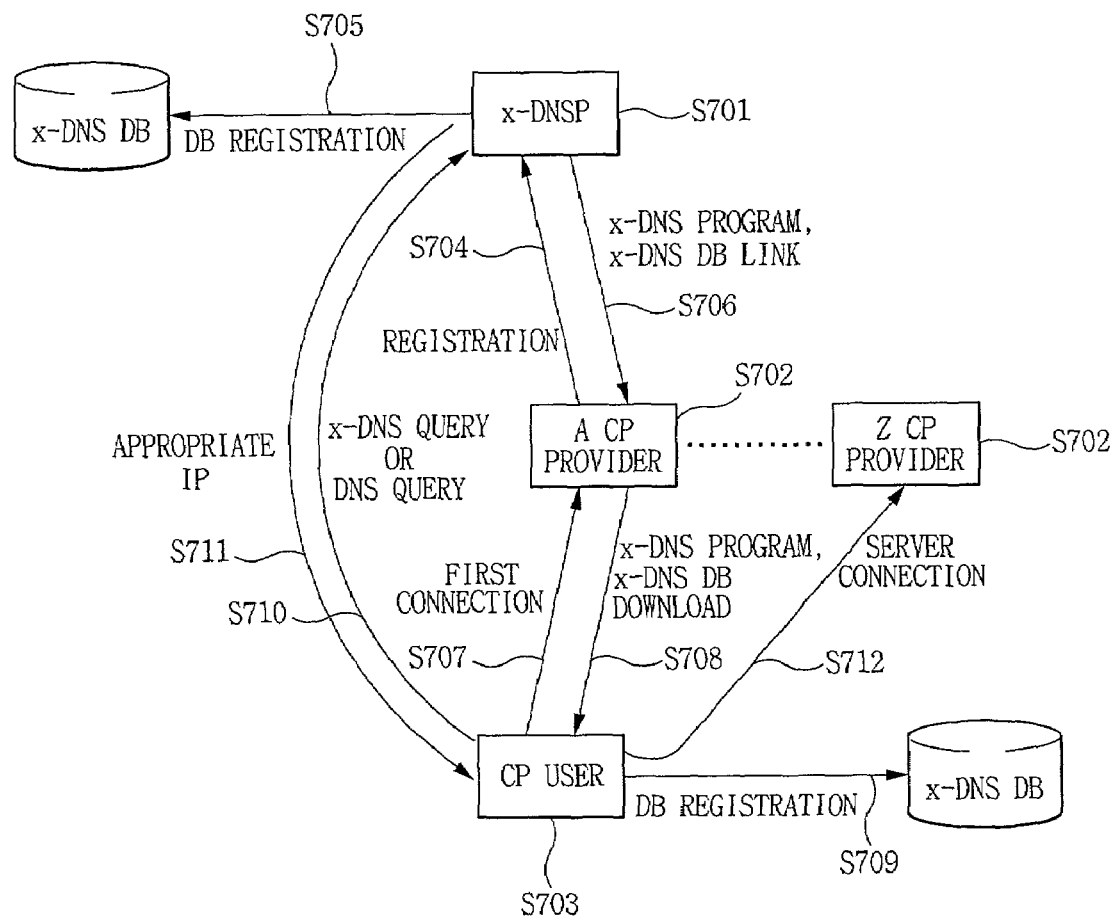
FIG. 8 is a flow chart for providing a user with a program in an x-DNSP.

FIG. 8 is a view for showing a structure and a flow chart of an entire system related to the present invention.

First, the x-DNSP is notified of registrations from CPs and provides a specialized domain name revolution service of each x-DNSP (GLB service provider, SLB service provider, home language domain name keyword and domain name resolving provider, and so on (S701).

If a general CP provider who is willing to receive the service of an x-DNSP is registered with the x-DNSP who provides services with the GLB function (S702), the contents service CPs provide can be provided to CP users faster.

Further, CPs receiving services from a particular x-DNSP as general CP users can use various servers such as web servers and the like faster and more diversely (S703).

If a CP user wishes to use an x-DNS he or she has registered in, the instant when the user gets in a web server and clicks on a menu or just gets in the web server, an x-DNS program and an x-DNS DB associated with a corresponding CP are automatically downloaded, and the user can receive the specialized service (GLB service) and the like the CP provides.

Registrations are made according to registration procedures by selecting an x-DNSP of providing services and so on a CP wishes to receive (S704).

At this time, the CP presents (domain name and so on) to the x-DNSP part of information of x-DNS DB form shown in Table 1 which is information related to domain names and keywords the CP wishes to receive services from the x-DNSP.

At this time, the x-DNSP registers the x-DNS DB received from the CP (S705).

Further, the x-DNSP links an x-DNS program and the x-DNS DB with the CP (S706).

The link with information on the x-DNS program and the x-DNS DB is accomplished by using object tags and parameters of the corresponding objects.

In the present invention, a service process is carried out as follows.

A CP user who makes the first connection connects to a server a CP is servicing. As well, the user clicks on a related menu if he or she wishes to receive the x-DNS service the server provides. At this time, it is dependent upon the policy of the CP to be automatically downloaded to the initially connected user (S707).

In any way, the x-DNS program and x-DNS DB are downloaded to a CP user's PC from the x-DNSP through the link of the CP (S708).

Further, add, delete, and correct operations are made to the x-DNS DB of the user's PC (S709).

After all the above process is completed, when the CP user tries a connection with a domain name and so on by driving a browser or other programs, the x-DNS DB of the PC is checked, and, if the domain name the CP user inputs exists, a query is requested to the x-DNSP about the corresponding domain name without a general query (S710).

If not exist, a process is carried out in the general DNS process manner (S711).

Further, the x-DNSP server identifies the query-requested domain name and an user's IP address, and transfers to the user's PC an appropriate IP address for the query-requested domain name (S711).

Thereafter, the program driven in the CP user's PC connects to the CP's server by using the transferred IP address (S712).

The present invention provides a method for automatically connecting to an x-DNS server by automatically installing and setting in a user's system various components for carrying out efficient functions in an optimum shortcut to reach the x-DNSP, eliminating inconvenience of a user's arbitrary DNS change of his or her system in order for the user to use a faster contents service on the internet, automatically connecting to a system of the x-DNSP in which a CP registers as a subscriber requests a connection to the CP, and automatically installing and setting components as to the x-DNSP in order to follow an optimum shortcut.

Although the preferred embodiment of the present invention has been described, it will be understood by those skilled in the art that the present invention should not be limited to the described preferred embodiment, but various changes and modifications can be made within the spirit and scope of the present invention as defined by the appended claims.

What is claimed is:

1. A method for resolution services of special domain names, comprising steps of:
   (1) receiving and storing information related to domain names and keywords whenever at least one contents provider connect to a special domain name resolution server and requests a registration;
   (2) linking the at least one contents provider in which the registered with the special domain name resolution server to a special domain name service program and a special domain name database containing related domain name information corresponding to the at least one contents provider, wherein the special domain name service program and the special domain name database relate to the special domain name resolution server;
   (3) automatically installing the special domain name service program by downloading the special domain name service program and the special domain name database to a terminal of a connection service user upon connecting to the contents of contents of the at least one contents provider; and
   (4) transferring to the user's terminal an IP address corresponding to a queried domain name that the user's terminal queried to the special domain name server by identifying a domain name and the user's IP address whenever the service user is connected to the special domain name server based on the special domain name database with an execution of the special name service program installed in step (3);
   (5) plugging in a web browser and the other internet desktop application program in a subscriber PC in order to connect to a specific contents provider on the internet and executing a special domain name service program for directly connecting to the special domain name server by a DLL process injection method, wherein the special domain name service program and the special domain name database containing domain name information related to the at least one contents provider are previously downloaded to the subscriber PC upon connection to the specific contents provider;
   (6) calling a domain name from the web browser or the other internet desktop application program for a connection to the specific contents provider;
   (7) carrying out a socket API interrupt as to information related to the domain name to be sent to a pre-set DNS server;
   (8) identifying whether the domain name information exists in a special domain name database;
   (9) carrying out a query about the special name to a corresponding special domain name server associated to contents providers existing in the special domain name database whenever the domain name information is present as a result of the identification of step (8);
   (10) connecting to a contents server relating to the domain name resolved in step (9); and
   (11) connecting to the pre-set local DNS server whenever the domain name information is absent as a result of the identification of step (8).

2. The method as claimed in claim 1, wherein the special domain name server provides at least one of Global Load Balance (GLB) service, Server Load Balance (SLB) service, language-by-country keyword resolution service, and domain name resolution service.

3. The method as claimed in claim 2, wherein the step (2) of linking the special domain name service program and the special domain name database with the at least one contents provider is to link by using object tags and corresponding object parameters in the HTML of homepage of the contents providers.

4. The method as claimed in claim 2, wherein the special domain service program in step (3) is automatically installed in an operating system of a user's PC by using the windows system message hooking technology.

5. The method as claimed in claim 2, wherein the step (3) for downloading the special domain name service program and the special domain name database information to the user's terminal by the at least one contents provider includes steps of:
   (3-1) checking by the at least one contents provider whether the special domain name service program is installed when the user is connected;
   (3-2) requesting an installation of components in an appropriate version for a system or the user whenever the components are not installed in step (3-1); and
   (3—3) requesting a re-installation of the components in case that an existing version is not appropriate by checking whether the version of the installed components are appropriate.

6. The method as claimed in claim 3, wherein the special domain service program in step (3) is automatically installed in an operating system of a user's PC by using the windows system message hooking technology.

7. The method as claimed in claim 3, wherein the step (3) for downloading the special domain name service program and the special domain name database information to the user's terminal by the contents providers includes steps of:
   (3-1) checking by the at least one contents provider whether the special domain name service program is installed when the user is connected;
   (3-2) requesting an installation of components in an appropriate version for the system if the components are not installed in step (3-l); and
   (3—3) requesting a re-installation of the components in case that an existing version is not appropriate by checking whether the version of the installed components are appropriate.

8. The method as claimed in claim 1, wherein the step (2) of linking the special domain name service program and the domain name database with the at least one contents provider is to link by using object tags and corresponding object parameters in the HTML of homepages of the contents providers.

9. The method as claimed in claim 8, wherein the special domain service program in step (3) is automatically installed in an operating system of a user's PC by using the windows system message hooking technology.

10. The method as claimed in claim 8, wherein the step (3) for downloading the special domain name service program and the special domain name database information to the user's terminal by the contents providers includes steps of:

(3-1) checking by the at least one contents provider whether the special domain name service program is installed when the user is connected;

(3-2) requesting an installation of components in an appropriate version for the system if the components are not installed in step (3-1); and (3—3) requesting a re-installation of the components in case that an existing version is not appropriate by checking whether the version of an installed components are appropriate.

11. The method as claimed in claim 1, wherein the special domain service program in step (3) is automatically installed in an operating system of a user's PC by using the windows system message hooking technology.

12. The method as claimed in claim 11, wherein the step (3) for downloading the special domain name service program and the special domain name database information to the user's terminal by the contents providers includes steps of:

(3-1) checking by the at least one contents provider whether the special domain name service program is installed when the user is connected;

(3-2) requesting an installation of components in an appropriate version for the system if the components are not installed in step (3-1); and (3—3) requesting a re-installation of the components in case that the existing version is not appropriate by checking whether the existing version of the installed components are appropriate.

13. The method as claimed in claim 1, wherein the step (3) for downloading the special domain name service program and the special domain name database information to the user's terminal by the at least one contents provider includes steps of:

(3-1) checking by the at least one contents provider whether the special domain name service program is installed when the user is connected;

(3-2) requesting a installation of components in an appropriate version for the system if the components are not installed in step (3-1); and (3—3) requesting a re-installation of the components in case that an existing version is not appropriate by checking whether the existing version of the installed components are appropriate.

14. A method for resolution services of special domain names, comprising steps of:

(1) plugging in a web browser and other internet desktop application program in a subscriber PC in order to connect to a specific contents provider on the internet an executing a special domain name service program for directly connecting to a special domain name server by a DLL process injection method, wherein the special domain name service program and a special domain name database containing domain name information related to at least one contents provider are previously downloaded to the subscriber PC upon connection to the specific contents provider;

(2) calling a domain name from the web browser or the other internet desktop application program for the connection to the specific contents provider;

(3) carrying out a socket API interrupt as to information related to the domain name to be sent to a pre-set local DNS server;

(4) identifying whether the domain name information exists in the special domain name database;

(5) carrying out a query about the special domain name to a corresponding special domain name server associated to contents providers existing in the special domain name database whenever the domain name information is present as a result of the identification of step (4);

(6) connecting to a contents server relating to the domain name resolved in step (5); and (7) connecting to a pre-set local DNS server whenever the domain name information is absent as a result of the identification of step (4).

15. A computer-readable storage medium, comprising steps of:

(1) plugging in a web browser and other internet desktop application program in a subscriber PC in order to connect to a specific contents provider on the internet and executing a special domain name service program for directly connecting to a special domain name server by a DLL process injection method, wherein the special domain name service program and a special domain name database containing domain name information related to at least one contents provider are previously downloaded to the subscriber PC upon connection to the specific contents provider;

(2) calling a domain name from the web browser or the other internet desktop application program for the connection to the specific contents provider;

(3) carrying out a socket API interrupt as to information related to the domain name to be sent to a pre-set local DNS server;

(4) identifying whether the domain name information exists in a special domain name database;

(5) carrying out a query about the special domain name to a corresponding special domain name server associated to contents providers existing in the special domain name database whenever the domain name information is present as a result of the identification of step (4);

(6) connecting to a contents server relating to the domain name resolved in step (5); and (7) connecting to a pre-set local DNS server whenever the domain name information is absent as a result of the identification of step (4).

* * * * *